Inventor:
Wilbur L. Ogden
By Gary Parker,
Juettner, Pigott & Cullinan
Attys

Figures 2, 3:
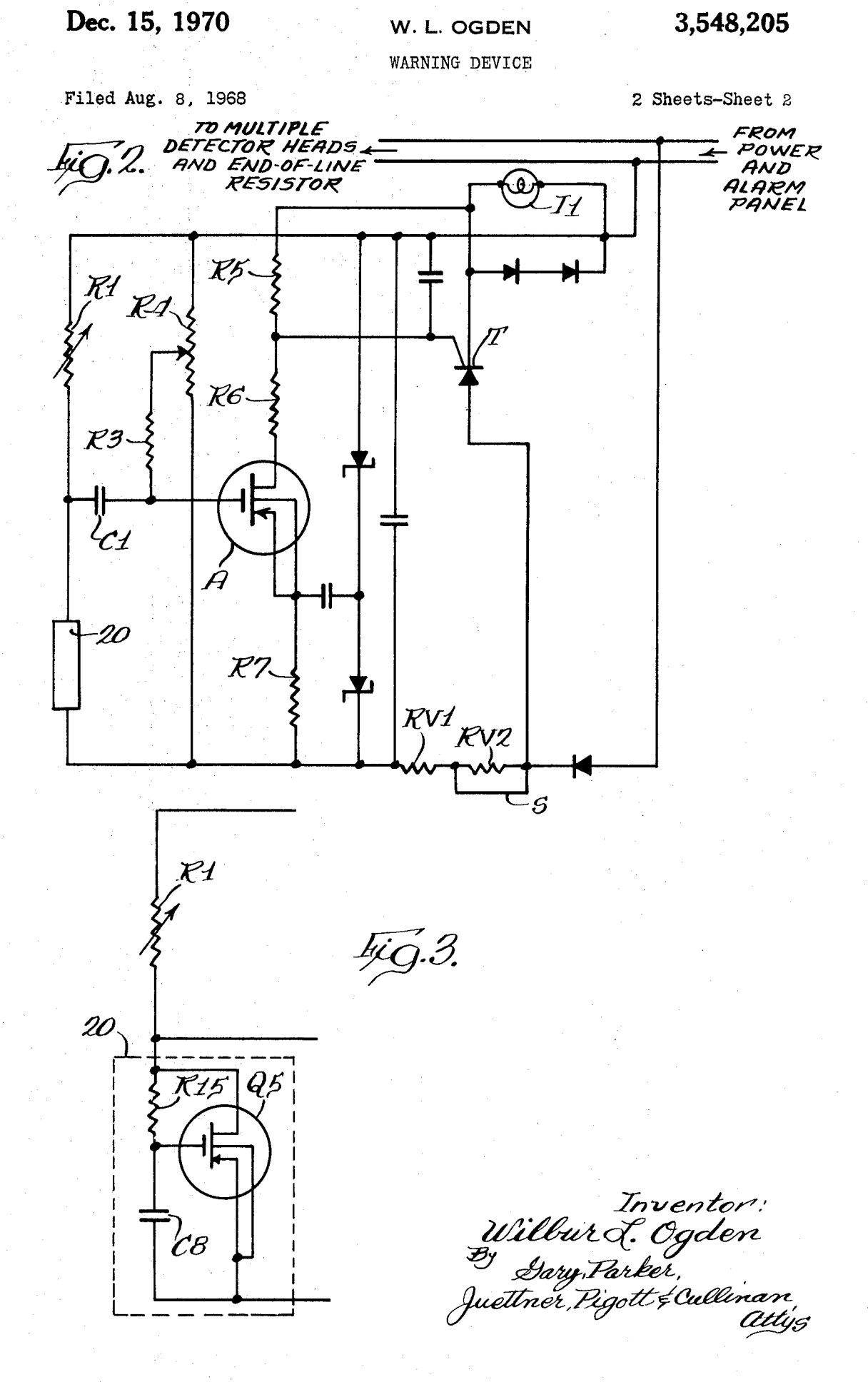

Dec. 15, 1970     W. L. OGDEN     3,548,205
WARNING DEVICE

Filed Aug. 8, 1968     2 Sheets-Sheet 2

Inventor:
Wilbur L. Ogden
By Gary Parker,
Juettner, Pigott & Cullinan
Attys

United States Patent Office 3,548,205
Patented Dec. 15, 1970

3,548,205
WARNING DEVICE
Wilbur L. Ogden, Aurora, Ill., assignor to BRK Electronics, Inc., Skokie, Ill., a corporation of Illinois
Filed Aug. 8, 1968, Ser. No. 751,086
Int. Cl. H03k 9/00, 17/56
U.S. Cl. 307—232                    10 Claims

ABSTRACT OF THE DISCLOSURE

Improvement upon the fire and smoke detecting and warning devices of Pat. 3,245,067 and copending application Ser. No. 709,415, filed Feb. 29, 1968; characterized by substitution for the prior electric bridge arrangement, wherein two identical sensors requiring precise matching of electrical characteristics and physical structure to consitute one a detector and the other a compensator, of a bridge arrangement of one sensor comprising the detector and an electronic circuit constituting an automatic compensator of substantially enhanced adaptability, practicality, reliability and service characteristics.

BACKGROUND OF THE INVENTION

Said patent and said application disclose devices for detection of products of combustion characterized by a pair of sensors, each comprising a substrate having a grid thereon and each responsive to changes in the electrical conductivity of air. The two sensors are connected in a normally balanced center tap bridge circuit so that predetermined imbalance between them will result in triggering an alarm circuit.

One sensor is freely exposed to the air to detect atmospheric changes promptly, and the other has a relatively shielded or delayed-access exposure to the air so as to compensate the first sensor in respect of slowly changing ambient conditions but not the rapid change which occurs upon initiation of a fire. Thus, the devices are responsive to and will emit an alarm signal upon occurrence of a pre-selected or faster rate of change in the electrical conductivity of the air, i.e., upon initiation of a fire as explained in greater detail in said patent and said application.

To provide a normally balanced bridge circuit, the two sensors must be substantially identical and have the same electrical responses to changes in ambient conductivity. This necessitates in the first instance testing of each grid and the pairing of grids having the same characteristics. Subsequently, in use, the exposed or detector grid or sensor will inherently collect a film of atmospheric residue (oil, dust, etc.) that will in time significantly change its electrical conductivity and/or its rate of response to changes in ambient conductivity, whereas the shielded compensator grid will collect such film considerably more slowly with a consequent imbalance of the bridge. This in turn necessitates periodic maintenance of the device, especially the cleaning of both grids or sensors to return the same to an electrically matched condition.

Due to their sensitivity, physically and electrically, the grids are expensive, must be handled carefully so as to avoid even a fingerprint thereon, and must be tested, paired and assembled, and disassembled, cleaned and reassembled, with great care and precision, which has been time consuming and costly and requires the service of experts.

SUMMARY OF INVENTION

An automatic electronic compensator is hereby substituted for the prior compensator grid or sensor, and serves to eliminate the need for the precise pairing of grids and the problems consequent upon such need.

Specifically, the invention provides a simple and compact electronic compensating circuit to be connected in a center tap bridge with the detecting grid, the circuit continually sensing or monitoring the electrical conductivity of said detecting grid and, subject to a preselected time delay, automatically compensating the bridge for any changes in the conductivity of the grid so as to maintain a constant voltage drop across the grid, except when a predetermiend change in the conductivity of the said grid occurs at a rate faster than the pre-selected time delay. In the latter case of course, the grid becomes sufficiently conductive and the bridge sufficiently unbalanced to emit a signal for triggering an alarm.

Because the compensating circuit senses a change in conductivity and the voltage change consequent thereon, and automatically adjusts the voltage to the preselected value within the limitations of the preselected time delay, the circuit automatically compensates for every slowly occurring and extraneous change not only in the atmosphere but in the detector grid itself. Consequently, even if the electrical characteristics of the grid change significantly over a period of time, due to film accumulation, fingerprints and/or other causes, the original sensitivity of the devices is fully maintained.

Thus, the invention provides the advantages of reducing the number of sensor grids to one, eliminating the need for testing and pairing of grids, substantially reducing the frequency and expertise of maintenance services, mitigating the adverse effects of ambient conditions and longevity of grid service, and maintaining the preselected sensitivity of the fire detector throughout its service life.

THE DRAWINGS

FIG. 2 is a circuit diagram of a line powered fire detecting device adapted to impose a fault on a line for alarm purposes in the event of a fire, which device also is equipped with the compensated bridge circuit of this invention; and FIG. 3 is a circuit diagram of a preferred embodiment of said self-compensating or self-balancing bridge circuit.

DESCRIPTION

Figure 1:
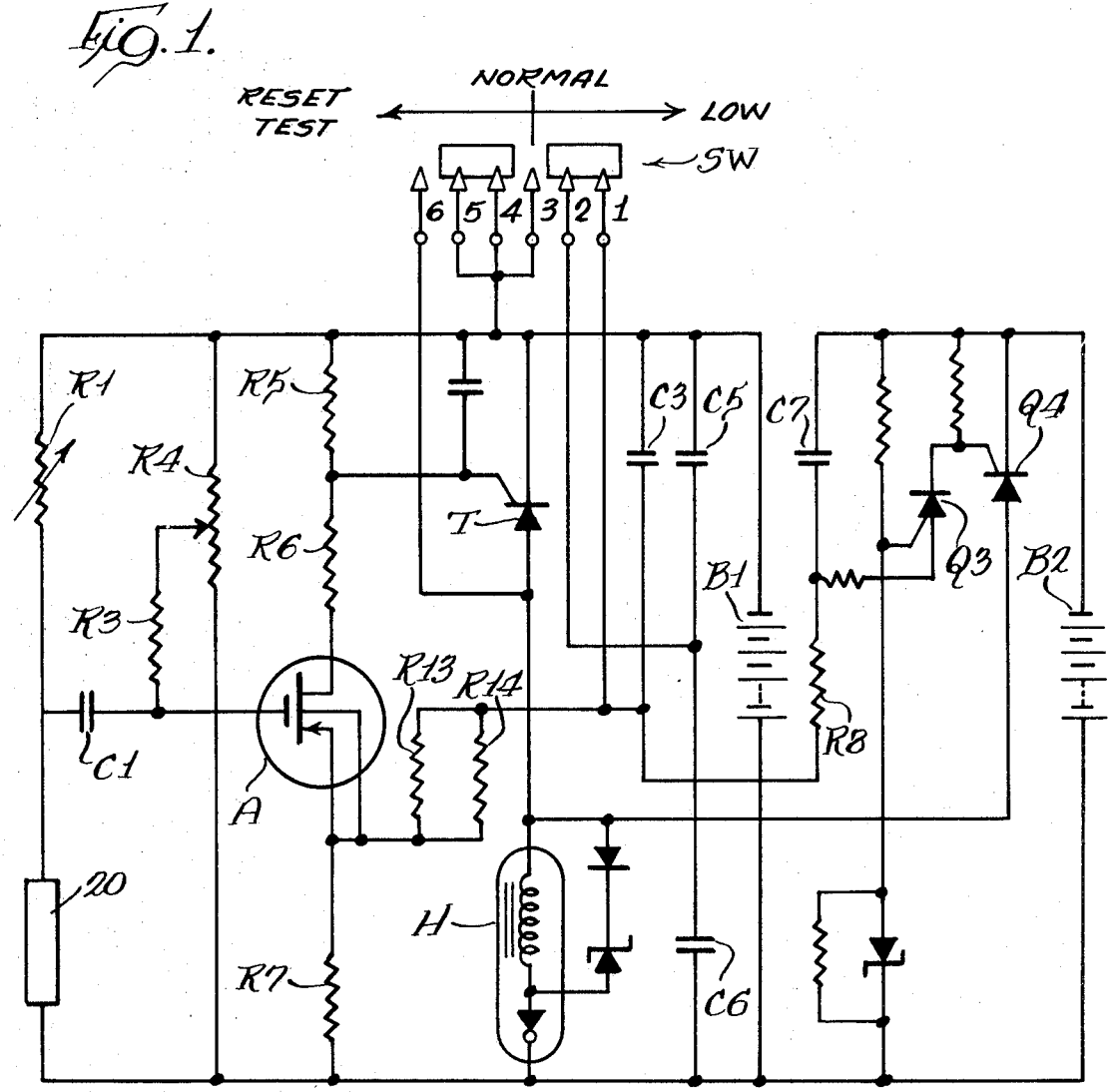
FIG. 1 is a circuit diagram of a totally self-contained fire detector and alarm device equipped with the compensated bridge circuit of this invention.

In order to acquaint those skilled in the art with my invention, and the manner of making and using it, I have shown and will now describe the best mode presently contemplated by me of carrying out my invention.

Except for the compensator indicated generally at 20, the circuit shown in FIG. 1 is essentially the same as the battery powered circuit of the self-contained detector and alarm device shown, described and claimed in said copending application Ser. No. 709,415, which circuit comprises a sensing bridge, an amplifier, an alarm circuit, a power supply, a supervisory circuit, and sensitivity control and reset means.

The sensing means of the detector comprises an impedance bridge made up of an impedance or resistance grid R1 (called the detector) freely open to the atmosphere, and means (herein designated 20) for time delayed but normal matching of the impedance of the grid R1 (called the compensator) resulting in a rate of change device that senses fast changes caused by combustion, but ignores relatively slow changes such as atmospheric variations or changes due to an individual smoking in the room.

When the detector senses the occurrence of combustion, in the form of invisible or visible combustion gases, its resistance is lowered by the combustion products impinging on the surface of grid R1. This unbalances the bridge, causing a signal to pass through coupling capacitor C1 to the amplifier A.

The amplifier A is made up of a single stage metal oxide silicon enhancement mode field effect transistor which matches the high impedance of the sensor bridge to the low impedance of the trigger circuit.

The MOSFET is adjustably biased by a potentiometer R4 through resistor R3, until the drain current through resistor R6 reaches a desired sensitivity setting. When the detector resistance decreases due to combustion products impinging on grid R1, current through R6 increases until the voltage drop developed across the resistor R5 is sufficient to turn on a trigger device T, which is preferably a silicon controlled rectifier. Resistor R7 in the MOSFET source normally limits the bias current to a value less than that required to trigger the SCR.

When the SCR triggers into the "on" condition, current flows through the horn H from battery B1, thereby sounding an alarm.

Power is supplied by a 10.7 volt mercury battery B1, which provides the small bias current to operate the sensing bridge and the amplifier, and also provides the current necessary to drive the horn in the event of an alarm.

The battery B1 is continually monitored by means of a supervisory battery B2 and its associated circuitry. When the current of battery B1 begins to fall off at the end of battery life, voltage drop across R7 is decreased. When this voltage drop reaches a predetermined level, at which the bucking voltage of battery B1 is overcome by battery B2, capacitor C7 charges through resistor R8 to the point where a programmable unijunction transistor or PUT Q3 switches on, in turn triggering an SCR Q4. When Q4 is triggered on, it connects the battery B2 to the horn H and thereby sounds an alarm. SCR Q4 can only remain switched on as long as gate current is supplied from the PUT Q3. Q3 remains on until capacitor C7 discharges through the PUT anode, whereupon Q3 shuts off, causing Q4 to shut off, and the horn to stop sounding. At this point, C7 again begins to charge through resistor R8 from battery B2, and after an elapsed time of approximately five minutes, the cycle is repeated. Thus, every five minutes the horn will blast for one to two seconds to signal the demise of battery B1 and the need to replace it.

The potentiometer R4 provides a basic factory authorized sensitivity adjustment for the detector, and sensitivity can be further controlled by adjustment of the values and/or removal of one or the other of resistors R13 and R14. However, adjustment of either of these control facilities by an unskilled individual is generally not advisable, and such controls are normally concealed from the individual owner of a detector. Nevertheless, to provide the user with some degree of control over sensitivity, the circuit is provided with two banks of capacitors, i.e., a first bank comprised of capacitor C3 and a second bank comprised of capacitors C5 and C6, both adapted to be coupled to the source of the amplifier A, and switch means SW including contacts 1 and 2 accommodating connection of the first bank only to the amplifier to afford a relatively low sensitivity and connection of both banks to the amplifier to afford a relatively high sensitivity. The switch SW is made conveniently accessible to facilitate selection of high sensitivity or low sensitivity as desired.

The trigger device T and its connections in the circuit are such that once triggered it will remain triggered until reset. To accomplish resetting, switch SW is provided with contacts 5 and 6 which when closed will cause the triggered device to be bypassed, the load thereon relieved and the device thereby to be reset to non-conducting or "off" condition, whereupon the alarm is turned off until the rate of change of ambient conditions is again such (or remains such) that the device is again triggered.

By connecting the bypass to switch contacts 5 and 6 in such manner that the primary power source B1 becomes directly closed upon the horn H, the switch simultaneously provides a convient means for manually checking the operability of the device and the condition of the battery B1.

Referring now to FIG. 2, a circuit is illustrated that is intended for a fire detecting device of the type shown in Pat. 3,245,067 which is line powered and adapted to impose a fault on the line for alarm purposes. In essence, this circuit is quite similar to the detecting, amplifying and triggering portions of the circuit of FIG. 1, with the addition of appropriate circuitry facilitating operation from any source of supply. In the preferred embodiment illustrated, the circuit is devised to operate at either 120 volts or 24 volts line power, either AC or DC.

As shown, a bridge circuit comprised of the detector grid R1 and the compensator 20 is connected through coupling capacitor C1 to the amplifier A, which is adjustably biased by potentiometer R4 through resistor R3 to a desired sensitivity setting.

When the circuit is fully energized and absent an alarm condition, there is very little current draw and the device is essentially wattless for practical purposes.

However, when the resistance of the detector R1 decreases due to combustion products, current through R6 increases until the voltage drop across resistor R5 is sufficient to turn on the SCR trigger device T. When the SCR triggers into the "on" condition, it effectively short circuits the power supply causing a significant line current draw capable of being sensed at a remote alarm panel for purposes of energizing a suitable alarm signal.

A lamp I1 is connected in circuit with the SCR to indicate by its illumination the particular detector head that has caused the alarm when a plurality of heads are connected to a common supply line.

The power supply rectifying and filtering portion of the illustrated circuit is believed obvious to persons of reasonable skill in the art and is therefore not described in detail, except to note that the resistors RV1 and RV2 are series dropping resistors. When the power supply is 120 volts, RV2 is shunted by a strap S, and when the power supply is 24 volts the strap S is either cut or removed, thereby to provide proper voltage adjustment.

In the case of either of the described circuits, since the compensator 20 is not larger than the previously employed compensating grid, the detector components may be conveniently mounted in a compact and attractive housing as shown in either said patent or said application, although the latter is preferred due to the assistive functions of the housing in early detection of a fire as described in said application.

Referring now to FIG. 3, the fully compensated bridge of this invention is comprised of a compensating circuit, indicated generally at 20, and a single sensor grid R1 freely exposed to ambient air and adapted to detect the presence of product combustion therein, the same as the corresponding grid of said application or said patent.

The compensator 20 comprises an electronic circuit which in essence is a very high resistance voltage regulator, maintaining a constant voltage drop with load changes from $10^5$ ohms to $10^{12}$ ohms. Load change is not instantaneous, but is a function of a resistance-capacitance charging circuit. In its elemental and preferred form, the circuit consists of three components, namely a device Q5 such as a transistor whose dynamic resistance can be controlled from a low resistance to a very high resistance, a resistor R15, and a capacitor C8. Q5 is preferably a MOSFET and is chosen to have a very low leakage current from drain to source, with a gate to source voltage of zero. R15 is chosen to be the same input impedance as the bias resistor R3 in the detection circuit, in a specific example $10^{11}$ ohms. C8 is chosen to provide a time delayed response by transistor Q5 to voltage changes resulting from resistance or conductivity changes of the detector grid R1. This allows for a carefully controlled preselected compensation rate and can vary depending on the type of fire to be detected and the prevailing atmospheric conditions. A nominal value is .01 mfd.

In physical assembly, the three components Q5, R15 and C8 are preferably embodied in a ring-like holder, identical to the holder for the compensating grid of the detector shown in said copending application or said patent, whereby the compensating circuit may simply be slipped into the place of such compensating grid to convert existing detectors from the old bridge circuit to the approved self-compensating bridge circuit of this invention.

In use of the improved detector, when voltage is first applied to the circuit, C8 has no charge and the gate of transistor Q5 is at the source potential. Depending upon the resistance of the detector grid, a certain voltage appears from drain to source of Q5. For purposes of explanation, assume the grid R1 has the same resistance as R15. At the instant of applied voltage, half the supply voltage appears across the grid R1 and half across transistor Q5, drain to source. C8 immediately begins to charge at a predetermined rate controlled by its value and R15. As C8 increases in charge, the voltage across the drain to source of Q5 increases and the voltage across the detector R1 decreases. As the voltage across C8 approaches the threshold voltage of transistor Q5, Q5 begins to change its resistance and continues to change its drain to source resistance, until the voltage drain to source is equal to the voltage across C8. This causes the voltage across Q5's drain to source to decrease and the voltage across the detector grid to increase. This voltage is maintained at a constant point because of the 100% negative feedback obtained from the coupling R15 from drain to gate. Because of this feedback, any change in the voltage drop from drain to source causes a corresponding change in the gate, causing a readjustment of the drain to source resistance and a regulation of the voltage, drain to source.

The above description applies fully to the circuit of FIG. 1, and to the circuit of FIG. 2 as far as detector compensation is concerned. If the overall alarm panel circuitry associated with the device of FIG. 2 is such that the detectors are disconnected from the source upon alarm, it may be necessary to supplement the circuit to facilitate initial charging of C8, but appropriate supplementation will be apparent to those skilled in the art and will not change the grid compensating characteristics of Q5, R15 and C8.

The above-described readjustment of the voltage, to maintain a constant voltage drop drain to source, does not occur simultaneously, but at a certain speed, predetermined by the resistance-capacitance time constant of R15 and C8. Thus, when products of combustion strike the detector grid, and are of sufficient magnitude and occur at a rate faster than the RC circuit of the compensator can compensate for them, the voltage across the transistor Q5 drain to source rises, causing the current of amplifier A (FIG. 1 or FIG. 2) to rise, energizing trigger T and causing an alarm.

Should the detector grid at any time take on a resistance characteristic other than its original resistance, transistor Q5 accommodates the new resistance by changing its resistance to a new value to maintain a constant voltage drop from drain to source. Also, because of the 100% negative feedback, the circuit is automatically freed from effects of temperature change.

If desired, further refinements in the circuit can be made within the skill of the art. For example, a second transistor may be paralleled across or substituted for R15, said transistor having its gate controlled by an RC resistance-capacitance network, such that at the instant of initial turn-on, a low impedance connection would occur, causing C8 to charge more rapidly and the gate of Q5 to reach its operating point at a faster rate. After the resistance-capacitance network had reached its charge point, the second transistor would turn off causing a high resistance for R15. The circuit would then function from this point on the same as previously described. Making R15 a dynamic resistance might be desirable under some circumstances.

Accordingly, while I have shown and described what I regard to be the preferred embodiment of my invention, it is to be appreciated that various changes, rearrangements and modifications may be made therein without departing from the scope of the invention, as defined by the appended claims.

I claim:

1. In a warning device having a sensor for detecting a predetermined condition and thereupon emitting a signal, compensating means for said sensor comprising means having dynamic impedance controllable from low to high impedance values and including source, drain and gate means, means connecting said source to drain means in bridge circuit with said sensor, impedance means connected to said drain and gate means, and time delay means connected to said source and gate means, the first-named means sensing the power drop across said sensor and automatically responding thereto in delayed time to maintain the power drop constant except when the time rate of change of the power drop exceeds the time rate of response of said first-named means.

2. In a device as set forth in claim 1, said first-named means comprising a transistor, said impedance means comprising a fixed resistance and said time delay means comprising a fixed capacitance.

3. In a device as set forth in claim 1, said first-named means comprising a MOSFET transistor.

4. In a device as set forth in claim 1, said sensor having a nominal resistance and said impedance means comprising a fixed resistance matched to the nominal resistance of said sensor.

5. In a device as set forth in claim 1, said time delay means comprising capacitance of a value selected to provide a predetermined time delay in the response of said first-named means to changes in the power drop across said sensor.

6. In a warning device having a sensor subject to change in its electrical conductivity upon occurrence of predetermined conditions and adapted to emit a sensible electrical signal upon occurrence of a given magnitude of change in its conductivity, means for compensating said sensor in respecet of non-critical transient conditions and restricting its emission of a sensible signal to occurrence of the given magnitude of change within a selected period of time, said compensating means comprising a transistor having source, drain and gate means, means connecting the source to drain means of said transistor in bridge circuit with said sensor, resistance and capacitance connected in series circuit with one another and parallel circuit with the source to drain means of said transistor, and means connecting said resistance in parallel with the drain to gate means and said capacitance in parallel with the source to gate means of said transistor.

7. In a device as set forth in claim 6, said transistor comprising a MOSFET.

8. In a device as set forth in claim 6, said capacitance being selected relative to said resistance and said transistor to provide a time delay equal to said selected period of time in the response of said transistor to changes in the electrical conductivity of said sensor.

9. In a device as set forth in claim 6, said sensor having a nominal impedance and said resistance being matched to the nominal impedance of said sensor.

10. In a device as set forth in claim 6, means for conversion of the emitted signal of the bridge, and impedance means biasing said conversion means to a preselected condition, said resistance being matched to said impedance means.

References Cited

UNITED STATES PATENTS

| | | | |
|---|---|---|---|
| 2,901,740 | 8/1959 | Cutsogeorge | 340—233 |
| 3,045,183 | 7/1962 | Laczko | 340—227X |
| 3,060,417 | 10/1962 | Blake | 340—227 |
| 3,071,713 | 1/1963 | Duncan | 317—153 |
| 3,320,602 | 5/1967 | Andrews | 340—233 |
| 3,406,389 | 10/1968 | Nailen | 340—227X |

JOHN S. HEYMAN, Primary Examiner

U.S. Cl. X.R.

307—251,293; 310; 340—127, 317—153